United States Patent
Wilcutts et al.

(10) Patent No.: US 9,267,454 B2
(45) Date of Patent: Feb. 23, 2016

(54) DRIVE TRAIN SLIP FOR VIBRATION MITIGATION DURING SKIP FIRE OPERATION

(71) Applicant: Tula Technology, Inc., San Jose, CA (US)

(72) Inventors: Mark A. Wilcutts, Berkeley, CA (US); Xin Yuan, Palo Alto, CA (US); Joshua P. Switkes, Menlo Park, CA (US); Steven E. Carlson, Oakland, CA (US); John F. Impeduglia, Simpsonville, SC (US); John W. Parsels, San Jose, CA (US)

(73) Assignee: Tula Technology, Inc., San Jose, CA (US)

( * ) Notice: Subject to any disclaimer, the term of this patent is extended or adjusted under 35 U.S.C. 154(b) by 266 days.

(21) Appl. No.: 13/963,819

(22) Filed: Aug. 9, 2013

(65) Prior Publication Data

US 2014/0041626 A1    Feb. 13, 2014

Related U.S. Application Data

(60) Provisional application No. 61/682,553, filed on Aug. 13, 2012.

(51) Int. Cl.
| | |
|---|---|
| *F02D 41/00* | (2006.01) |
| *F02D 41/02* | (2006.01) |
| F02D 41/18 | (2006.01) |
| F02D 11/10 | (2006.01) |

(52) U.S. Cl.
CPC ............ *F02D 41/0087* (2013.01); *F02D 41/00* (2013.01); *F02D 41/022* (2013.01); *F02D 11/105* (2013.01); *F02D 41/18* (2013.01); *F02D 2250/18* (2013.01)

(58) Field of Classification Search
CPC ..... F02D 41/00; F02D 41/0087; F02D 41/022
USPC ........ 123/350, 481, 325, 332, 198 F; 701/112; 477/39, 181
See application file for complete search history.

(56) References Cited

U.S. PATENT DOCUMENTS

| | | |
|---|---|---|
| 4,434,767 A | 3/1984 | Kohama et al. |
| 4,489,695 A | 12/1984 | Kohama et al. |
| 4,509,488 A | 4/1985 | Forster et al. |
| 5,374,224 A | 12/1994 | Huffmaster et al. |
| 5,377,631 A | 1/1995 | Schechter |

(Continued)

OTHER PUBLICATIONS

International Search Report dated Feb. 5, 2014 from International Application No. PCT/US2013/054417.

(Continued)

*Primary Examiner* — Mahmoud Gimie
(74) *Attorney, Agent, or Firm* — Beyer Law Group LLP

(57) ABSTRACT

A variety of methods and devices for mitigating power train vibration during skip fire operation of an engine are described. In one aspect, the slip of a drive train component (such as a torque converter clutch) is based at least in part upon a skip fire characteristic (such as firing fraction, selected firing sequence/pattern, etc.) during skip fire operation of an engine. The modulation of the drive train component slip can also be varied as a function of one or more engine operating parameters such as engine speed and/or a parameter indicative of the output of fired cylinders (such as mass air charge).

27 Claims, 3 Drawing Sheets

(56) References Cited

U.S. PATENT DOCUMENTS

| | | | |
|---|---|---|---|
| 5,540,633 A | 7/1996 | Yamanaka et al. | |
| 6,158,411 A | 12/2000 | Morikawa | |
| 6,619,258 B2 | 9/2003 | McKay et al. | |
| 6,843,752 B2 | 1/2005 | Bolander | |
| 7,032,545 B2 | 4/2006 | Lewis et al. | |
| 7,032,581 B2 | 4/2006 | Gibson et al. | |
| 7,063,062 B2 | 6/2006 | Lewis et al. | |
| 7,066,136 B2 | 6/2006 | Ogiso | |
| 7,086,386 B2 | 8/2006 | Doering | |
| 7,179,199 B2 | 2/2007 | Kushiyama et al. | |
| 7,231,907 B2 | 6/2007 | Bolander et al. | |
| 7,288,046 B2 | 10/2007 | Boone et al. | |
| 7,503,312 B2 | 3/2009 | Surnilla et al. | |
| 7,532,972 B2 | 5/2009 | Kolmanovsky et al. | |
| 7,785,230 B2 * | 8/2010 | Gibson et al. | 477/62 |
| 7,930,087 B2 | 4/2011 | Gibson et al. | |
| 7,941,994 B2 | 5/2011 | Surnilla et al. | |
| 8,052,575 B2 | 11/2011 | Albertson et al. | |
| 8,489,303 B2 * | 7/2013 | Phillips | B60K 6/485 180/65.265 |
| 2005/0216132 A1 | 9/2005 | Masters et al. | |
| 2007/0131196 A1 * | 6/2007 | Gibson et al. | 123/198 F |
| 2007/0243971 A1 * | 10/2007 | Brevick | F16H 61/143 477/70 |
| 2008/0262712 A1 | 10/2008 | Duty et al. | |
| 2008/0288146 A1 | 11/2008 | Beechie et al. | |
| 2009/0239707 A1 * | 9/2009 | Albertson | F16H 61/143 477/174 |
| 2010/0050993 A1 | 3/2010 | Zhao et al. | |
| 2011/0030657 A1 | 2/2011 | Tripathi et al. | |
| 2011/0112734 A1 * | 5/2011 | Whitney et al. | 701/54 |
| 2011/0288734 A1 * | 11/2011 | Phillips | B60K 6/485 701/58 |

OTHER PUBLICATIONS

Written Opinion dated Feb. 5, 2014 from International Application No. PCT/US2013/054417.

* cited by examiner

DRIVE TRAIN SLIP FOR VIBRATION MITIGATION DURING SKIP FIRE OPERATION

CROSS-REFERENCE TO RELATED APPLICATIONS

This application claims priority to U.S. Provisional Patent Application No. 61/682,553, filed Aug. 13, 2012, entitled "TCC SLIP FOR VIBRATION MITIGATION DURING SKIP FIRE OPERATION," which is hereby incorporated by reference.

FIELD OF THE INVENTION

The present invention relates generally to skip fire control of internal combustion engines. More particularly the slip of a power train component such as a torque converter clutch is used to help mitigate vibration during skip fire operation of an engine.

BACKGROUND

Most vehicles in operation today (and many other devices) are powered by internal combustion (IC) engines. Internal combustion engines typically have a plurality of cylinders or other working chambers where combustion occurs. Under normal driving conditions, the torque generated by an internal combustion engine needs to vary over a wide range in order to meet the operational demands of the driver. Over the years, a number of methods of controlling internal combustion engine torque have been proposed and utilized. Some such approaches contemplate varying the effective displacement of the engine. One such approach is often referred to as "skip fire" engine control. Skip fire engine control contemplates selectively skipping the firing of certain cylinders during selected firing opportunities. Thus, for example, a particular cylinder may be fired during one firing opportunity and then may be skipped during the next firing opportunity and then selectively skipped or fired during the next. This is contrasted with conventional variable displacement engine operation in which a fixed set of the cylinders are deactivated during certain low-load operating conditions. In general, skip fire engine control is understood to offer a number of potential advantages, including the potential of significantly improved fuel economy in many applications.

A stereotype associated with skip fire engine control is that skip fire operation of an engine will make the engine run significantly rougher than conventional operation. In many applications such as automotive applications, one of the most significant challenges presented by skip fire engine control is vibration management. The present application describes techniques that utilize torque converter clutch slip (and/or the slip of another drive train component) to mitigate vibration during skip fire operation of an engine.

SUMMARY

A variety of methods and devices for mitigating power train vibration during skip fire operation of an engine are described. In one aspect, the slip of a drive train component (such as a torque converter clutch) is based at least in part upon a skip fire characteristic (such as firing fraction, selected firing sequence/pattern, etc.) during skip fire operation of an engine. The modulation of the drive train component slip can also be varied as a function of one or more engine operating parameters such as engine speed and/or a parameter indicative of the output of fired cylinders (such as mass air charge) and/or other operational characteristics of the vehicle.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1:
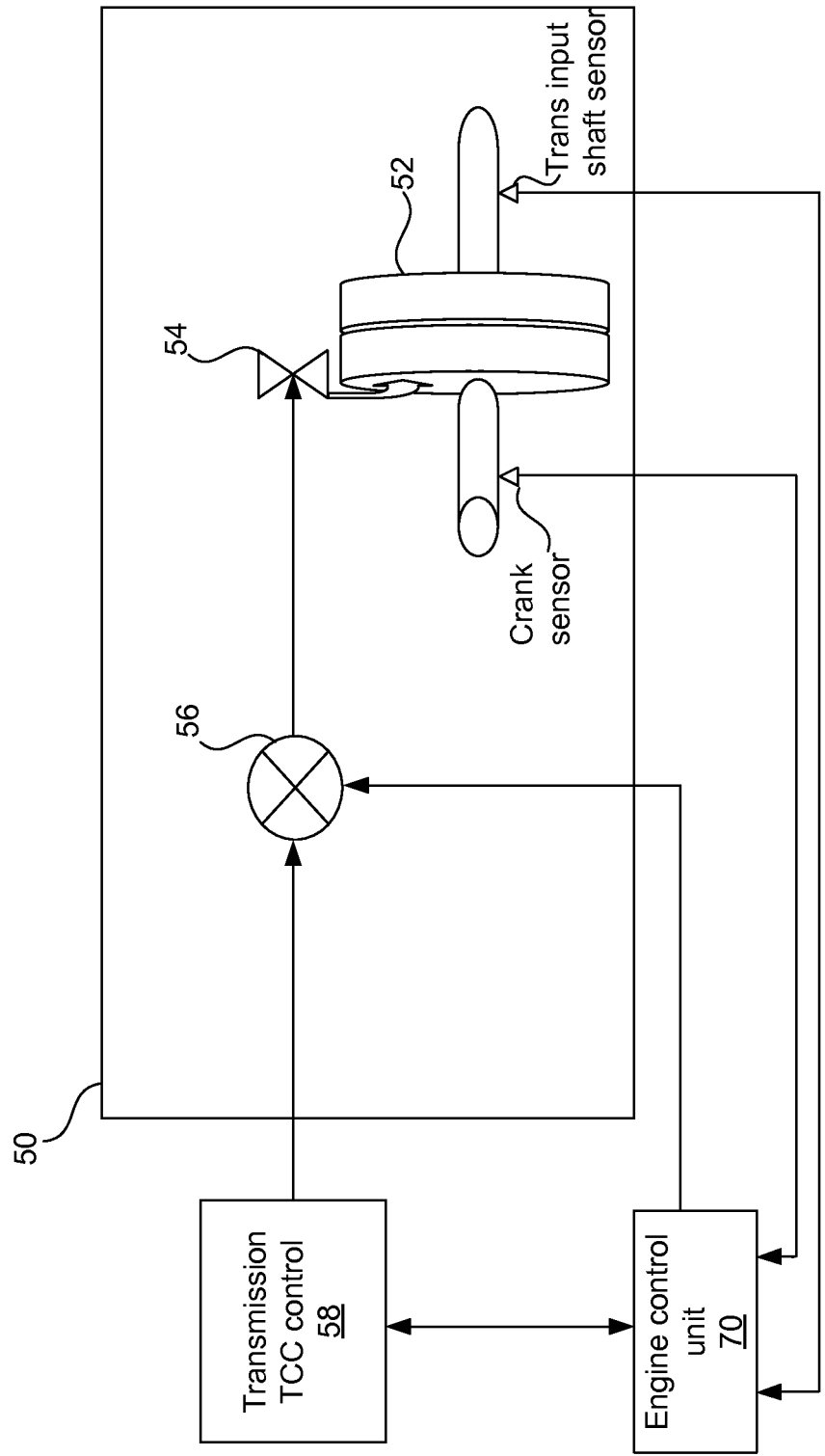
FIG. 1 is a schematic diagram of a torque converter clutch control system architecture that is suitable for use controlling torque converter clutch slip in conjunction with skip fire engine control.

In skip fire operation, one of the major issues to address is the vibration generated by the irregular firing of cylinders. The present invention generally contemplates the use of drive train slip to help mitigate undesirable vibrations that may otherwise be excited during skip fire operation of an internal combustion engine.

As is well known to those familiar with automotive design, vehicles with automatic transmissions often have a torque converter with a torque converter clutch (TCC). The torque converter clutch allows driveline components downstream of the TCC (e.g., the transmission) to run at a different rotational speed than the TCC's input shaft, which is typically rotating at the engine speed (i.e., at engine RPM). The amount of slip permitted by the TCC is typically regulated by adjusting a pulse-width modulated signal which controls solenoid valves that increase or decrease the hydraulic line pressure, which in turn mechanically affects how much the torque converter clutch slips relative to the input shaft speed. When desired, the TCC can be operated at or nearly at a locked-state, which allows little to no loss in efficiency from input to output of the TCC (i.e. input RPM≈output RPM). In certain operational modes such as steady-state cruising, the TCC is typically set to a locked or a low slip state.

The amount of slip permitted by the TCC (i.e., the difference between the input RPM1 and the output RPM2) is sometimes referred to herein as the slip RPM. During transitions, the amount of slip permitted by the TCC (e.g., the TCC slip RPM) can be increased, thereby effectively partially disconnecting the engine from the rest of the drive train and vehicle. This altered torque transfer path dampens torque impulses presented to the TCC which can help smooth vehicle operation by helping reduce vibrations.

There are several ways that torque converter slip can be used to help mitigate vibrations during skip fire operation of an engine. A first approach will be described in conjunction with the skip fire controller illustrated in FIG. 2 which includes a firing fraction calculator 90 that determines the skip fire firing fraction that is to be used at any time. (The firing fraction is effectively the percentage of the possible cylinder firings that are actually fired over time). A similar approach can also be used in any skip fire controller that uses predefined firing patterns or that determines slip based on a firing decision and/or a firing history (e.g., the current firing decision, a sequence of firing decisions, etc.).

In practice, the amount of vibration generated during skip fire operation of an engine tends to vary with the firing pattern or the firing fraction that is used at any time. (The firing fraction is effectively the percentage of the possible cylinder firings that are actually fired). Some firing patterns and some firing fractions tend to have good vibration characteristics, while others tend to have less desirable vibration characteristics. Of course, there are a number of other operational factors that may affect vibration characteristics including engine speed, transmission gear, etc. In general, the vibration characteristics of any particular vehicle can typically be characterized such that the vibrations associated with any particular set of skip fire operating conditions can be reasonably predicted.

The assignee of the present application has described a number of skip fire controllers that contemplate determining and then delivering a desired firing fraction. Examples of such controllers are described in U.S. patent application Ser. Nos. 13/654,244; 13/654,248; 13/744,134 and 61/682,065, which are all incorporated herein by reference. When the firing fraction is known, the torque converter clutch slip can be controlled as a function of the firing fraction to help dampen vibrations when appropriate. For example, when a firing fraction known to have good vibration characteristics is used, the torque converter may be placed in a low TCC slip state (which may be near or if practical at lock-up). When a firing fraction known to have less favorable vibration characteristics is used, then the TCC slip may be increased appropriately to help dampen the torque impulses that are generated by irregular firings. The amount of TCC slip that is appropriate for any given firing fraction or firing pattern will vary as a function of the amount of vibration that would otherwise be expected by the use of that firing fraction/firing pattern. That is, the TCC slip may be increased when higher engine vibrations are expected to be present and decreased when firing fractions are used that expect lower levels of engine vibration. Thus, for any specific firing fraction an associated TCC slip may be selected. The appropriate TCC slip values may be determined empirically, analytically or by any other suitable method and may be stored in look-up tables, dynamically calculated or made available to the controller using any other suitable technique. By way of examples, TCC slip values in the range of 10-60 RPM are believed to be appropriate for some existing vehicles operated in a skip fire operational mode.

As suggest above, the vibration that is perceptible to an occupant of a vehicle will vary with a number of operating conditions in addition to the firing fraction. Some of the more prominent factors include engine speed, vehicle (wheel) speed, torque output per firing (which may be influenced by variables such as cylinder air charge (MAC) or intake manifold pressure (MAP)), transmission gear, etc. For example, a particular firing fraction that runs relatively smoothly at a high RPM in a high gear, may not run as smoothly at a low RPM in a low gear when the torque output per firing is high. Thus, the TCC slip controller may be arranged to consider other factors in addition to the firing fraction when selecting the appropriate TCC slip value. This can be accomplished in a number of ways, as for example, through the use of multi-dimensional look-up tables which use multiple operating characteristics as indices. It should be appreciated that the indices to such tables can be widely varied to meet the need of any particular application. By way of example, firing fraction, engine speed, vehicle speed, torque output per cylinder firing and transmission gear are all parameters that could be used as indices to such tables. These indices can be used in any combination and/or in conjunction with other indices deemed appropriate as well. In other embodiments, a predictive model of engine excitation and drivetrain/vehicle response can be used to determine an appropriate level of TCC dampening/slip.

FIG. 1 illustrates a torque converter clutch control system architecture that is suitable for implementing the described approach. In the illustrated embodiment, a torque converter 50 includes a torque converter clutch 52. The clutch torque capacity, which, along with the actual engine torque applied to the clutch, and rotational speed of the transmission input shaft, determines the amount of slip at clutch 52, varies as a function of hydraulic pressure applied to the clutch. A hydraulic pressure line (not shown) feeds the torque converter clutch 52 and a first solenoid 54 serves as a valve in the hydraulic pressure line. Therefore the opening and closing of the solenoid valve 54 can be used to regulate increases in hydraulic pressure within the torque converter and thus the amount of slip that occurs in the torque converter clutch. A second solenoid (not shown) controls a gate that bleeds pressure from the torque converter clutch and is thus used to control pressure reductions within the torque converter clutch. The opening and closing of the solenoids and thus the hydraulic pressure within the torque converter 52 is controlled by a solenoid driver module 56. The solenoid driver module 56 is responsive to commands from both a transmission control unit's TCC control block 58 and a skip fire controller 70.

Although the control system for a torque converter clutch is shown in FIG. 1, it should be appreciated that similar control systems may be provided for any drive train component having controllably variable slip. These could include, for example, a differential, a dual clutch transmission or any other transmission that allows an internal clutch to slip, or any other drive train components that allows slip.

Figure 2:
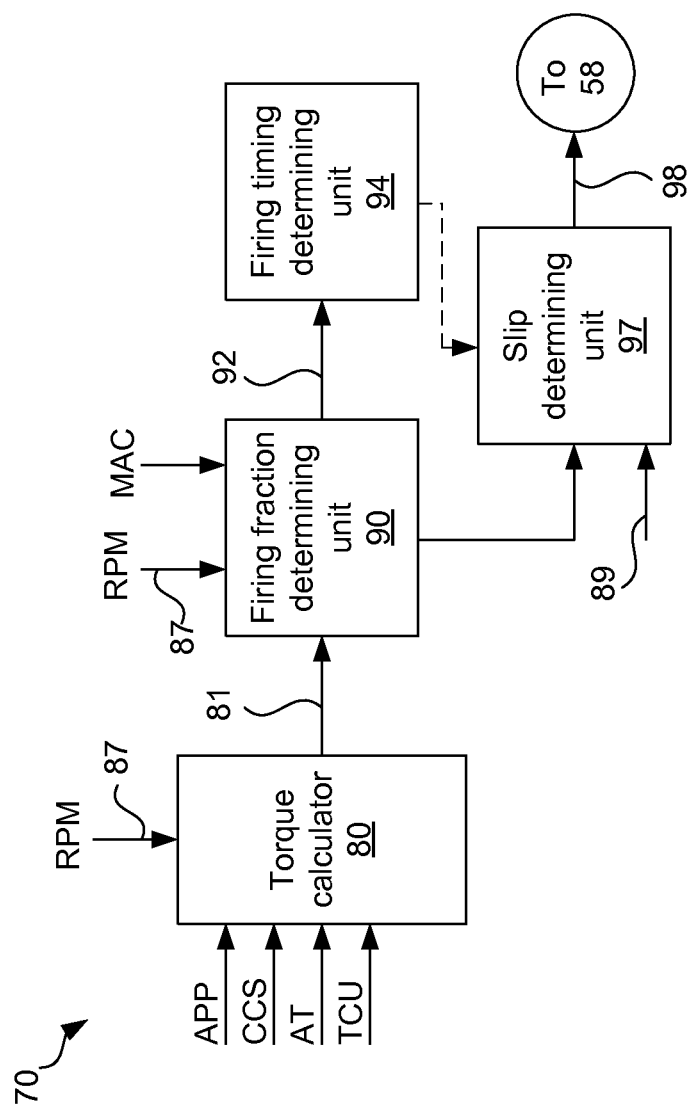
FIG. 2 is a block diagram of a skip fire engine controller arranged to integrate torque converter clutch slip with firing fraction selection.

Referring next to FIG. 2, a skip fire controller suitable for managing TCC slip will be described. FIG. 2 is a block diagram that diagrammatically illustrates a skip fire controller arranged to facilitate TCC slip management in accordance with one described embodiment. The skip fire controller 70 includes a torque calculator 80, a firing fraction determining unit 90 (sometimes referred to as a firing fraction calculator) and a firing timing determining unit 94. The torque calculator 80 is arranged to determine the desired engine torque at any given time based on a number of inputs. The torque calculator outputs a requested torque 81 to the firing fraction calculator 90. The firing fraction calculator 90 is arranged to determine a firing fraction that is suitable for delivering the desired torque based on the current operating conditions and informs the firing timing determining unit 94 of the firing fraction 92 that is appropriate for delivering the desired torque. The firing timing determining unit 94 is responsible for determining a firing sequence that delivers the desired firing fraction. The firing sequence can be determined using any suitable approach. In some implementations, the firing may be determined dynamically on an individual firing opportunity by firing opportunity basis as described in some of the patents incorporated below. In others, pattern generators or predefined patterns may be used to facilitate delivery of the desired firing fraction. By way of example, co-assigned U.S. Pat. Nos. 7,577,511, 7,849,835, 7,886,715, 7,954,474, 8,099, 224, 8,131,445, 8,131,447 which are incorporated herein by reference and other co-assigned patent applications describe a number of skip fire controllers that are well suited for determining an appropriate firing sequence based on potentially time varying requested firing fractions and/or requested engine outputs.

The firing fraction 92 may also be delivered to a slip determining unit 97 that is responsible for determining the slip that is appropriate based on the current firing fraction and any other operating parameters that are considered relevant to the TCC slip determination. Such operating parameters may include engine speed 87, mass air charge (MAC), transmission gear, cylinder charge, ignition timing, fuel injection timing, valve timing, etc. In FIG. 2, input 89 is intended to represent other such operational characteristics that may be utilized by unit 97 in its determination of the appropriate slip. The appropriate TCC slip for various firing fractions may be retrieved from lookup tables 99, calculated algorithmically, or determined in any other suitable manner. The slip determining unit 97 then outputs a signal 98 to TCC slip controller (e.g., solenoid driver module 56 shown in FIG. 1) which controls the torque converter clutch appropriately to provide the desired TCC slip. In other embodiments, the firing fraction determining unit, the ECU or a variety of other components can be used to determine the appropriate torque TCC slip level (e.g., the slip determining unit 97 may be incorporated into the such components).

Many skip fire controllers utilize predefined firing patterns rather than explicitly designating a desired firing fraction. The TCC slip control described above with respect to the use of different firing fractions is equally applicable to skip fire controllers using predefined firing patterns (which typically each inherently correspond to a designated firing fraction) or other mechanisms to determine the timing of the firings. By way of example, each available skip fire firing pattern may be associated with a corresponding TCC slip value. As previously described, the appropriate TCC slip values may be determined empirically, analytically or by any other suitable method and may be stored in look-up tables, dynamically calculated or made available to the controller using any other suitable technique. Further, as suggested above, the slip determined for any particular firing pattern may also vary as a function of one or more operational characteristics such as engine speed, vehicle speed, transmission gear and/or torque output per cylinder firing (or a parameter indicative thereof such as mass air charge (MAC), MAP, fuel charge, etc.).

Firing fractions and firing patterns are two skip fire characteristics that can be used as inputs for the slip determination. However, it should be appreciated that other characteristics of skip fire operation such as firing history, a specific firing sequence used, or to be used at any particular time, or even a particular firing decision can be used in place of, or in addition to the firing fraction or firing pattern. For example, the slip determining unit 97 could look at the history of the last X firings, an expected upcoming firing sequence (e.g., the next X firings), a current sequence which may both past and/or future firings, (e.g., the firings in the previous, current and/or next engine cycle or some other number of firing opportunities). In another example, the slip can be determined based on the detection of certain sequences, etc.

A second TCC slip control approach will be described next. This embodiment contemplates more rapid modulation of the TCC slip than the firing fraction/firing pattern based approach described above. In this embodiment, the slip is controlled on a very rapid basis, as for example on the order of the frequency of the engine firing opportunities. To understand the motivation for this approach, it is helpful to consider the impact that torque impulses have on passenger comfort. Generally, the greater the magnitude of a torque impulse, the greater the risk that such an impulse will contribute to undesirable vibration or harshness that is perceptible by a vehicle occupant. Therefore, conceptually it would be desirable to increase the TCC slip when larger magnitude torque impulses are expected, in order to help damp vibrations. At the same time, in order to improve fuel efficiency, it would be desirable to reduce the slip, or possibly lock up the torque converter clutch when only small torque impulses are present.

During skip fire operation, there are significant differences in the nature and magnitude of torque impulses that may occur at different points in a skip fire firing sequence. For example, with the conditions of all firings being roughly equal, the torque impulse associated with a firing of a cylinder that follows one or more skips will be greater than the torque impulse associated with a firing in which the same cylinder was fired the previous engine cycle. The torque impulse associated with a skipped working cycle is generally much smaller than the torque impulse associated with any firing. Therefore, in practice, the torque impulse associated with any particular cylinder firing will be affected by a number of factors including the magnitude of the work produced by the firing and the fire/skip history of the previous several cylinder firing opportunities.

Figure 3:
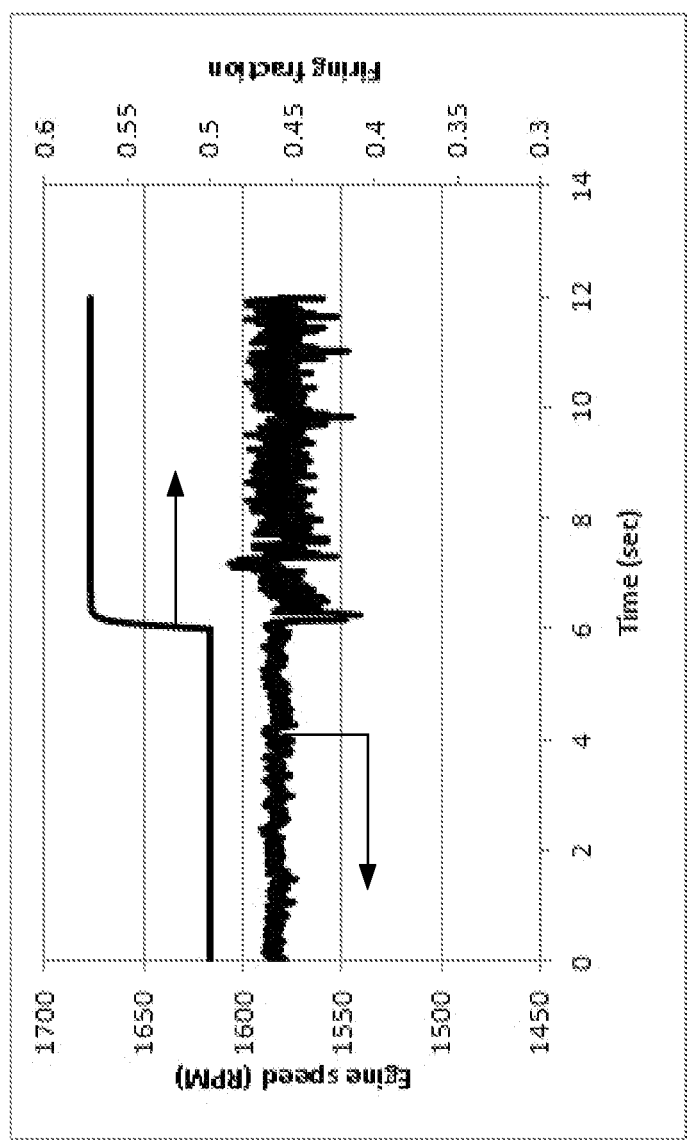
FIG. 3 shows experimental data illustrating the engine speed vs. time for two different firing fractions.

FIG. 3 shows experimental data illustrating the engine speed vs. time for two different firing fractions. As can readily be seen in the drawing, different firing fractions can have very different characteristics regarding engine speed variation. In the illustrated experiment, the first firing fraction is approximately ½ and the amplitude of the engine speed variations is relatively low. The second firing fraction is approximately 0.57 which has much higher amplitude engine speed variations which is indicative of higher torque impulses. Although the transfer function between engine torque pulses and cabin vibrations is a complex function, in general, higher torque impulses correlate with higher level of passenger perceptible engine caused vibration. Accordingly, this data suggest that more TCC slip would be desirable when the 0.57 firing fraction is used and that less TCC slip would be appropriate when the ½ firing fraction is used.

At the time any firing decision is made, the skip fire controller knows the recent firing history (and the expected magnitude of any commanded firing can be determined). This knowledge can be advantageously used to actively modulate the TCC slip in a manner that helps damp large torque impulses on a cylinder-event basis (i.e., on a firing opportunity by firing opportunity basis). In a simple example, a TCC controller can be designed to command: (1) a first (higher) TCC slip value any time a firing is commanded that follows a skip; (2) a second (intermediate) TCC slip value any time a firing is commanded that follows another firing; and (3) a third (lower) TCC slip value any time a skip is commanded. Effective implementation of this high bandwidth slip control approach may require appropriate changes to the TCC hydraulic systems and/or subsystem software to increase its time response characteristics. Alternatively, non-hydraulic clutch actuations systems may be used to actuate the TCC. By way of example, US Patent Publication No. 20120211323 describes one alternative clutch actuation technology.

When a relatively simple approach such as looking at the firing history of the immediately preceding firing opportunities is used, it is believed that it would typically not be necessary to consider more than the 10 previous firing opportunities when determining the appropriate TCC slip although longer histories may be consider if desired and the history of the previous 1-7 firings is believed to be satisfactory for most applications. In still other embodiments, other factors, including the net torque produced by a commanded firing, net crankshaft torque, engine speed, transmission gear, MAC, cam phasing, spark timing, etc. can be used in determining the appropriate TCC slip values.

In more advanced TCC slip control schemes, a longer window of previous firing decisions can be used to determine the appropriate TCC slip value for any particular firing. For example, in some implementations it may be desirable to identify frequency components of particular concern in the selected firing fraction and then to utilize TCC slip (or other drive train component slip) to mitigate such frequency components. By way of example, frequency components in the range of 0.5 to 10 Hz tend to be most noticeable to vehicle passengers. Many potential firing fraction/engine speed combinations have frequency components in that range that can be predicted. With knowledge of the frequency components of concern, TCC slip can be modulated appropriately to mitigate the vibrations that would otherwise occur during skip fire operation. Of course, other processing of a firing sequence, pattern or fraction can be done as appropriate to identify skip fire characteristics useful in modulating the slip of a TCC or other drive train component.

In other embodiments of this high bandwidth approach, predictive models of engine excitation and drivetrain/vehicle response may be used to determine the appropriate level of TCC slip values. In such models, it may be useful to use a model the expected crankshaft torque in determining the desired TCC slip. To better understand the motivation for tracking the net crankshaft torque, it should be appreciated that the net torque provided by a crankshaft is a function of the composite of the torque of all of the cylinders. Each stroke of each cylinder has an effect on the net crankshaft torque. Typically, for a fired working cycle, the intake stroke imparts a negative torque (pumping loss) the magnitude of which is based on a variety of factors including manifold pressure and valve timing. The compression stroke imparts a higher negative torque as the intake air is compressed. The combustion/ expansion stroke produces a strong positive torque and the exhaust stroke has its own torque profile.

A skipped working cycle has a very different profile. For example, if the cylinder is effectively deactivated during skipped working cycles (i.e., the valves are not opened), the deactivated strokes effectively act as "springs", under various types of gas trapping strategies. If the intake valve is not opened after a normal exhaust event, the deactivated "intake" stroke absorbs more torque (because no new air was actually introduced to the cylinder so the piston is effectively drawing against a larger vacuum). The deactivated compression stroke may actually impart a positive torque generally close to the opposite of the torque absorbed during the "intake" stroke. The deactivated expansion stroke again has a negative torque, generally similar to the negative torque imparted during the deactivated "intake" stroke—which is very different than the torque applied during a fired "combustion/expansion" stoke. The "exhaust" stroke may then again act as a positive torque if the exhaust valve remains closed. In still other situations, the cylinders can be deactivated with either a charge of air or a charge of exhaust gases in the cylinder. (A charge of air might occur if the intake valve is opened in a normal manner but no combustion occurs and the exhaust valve is held closed. A charge of exhaust gases might occur if the exhaust and intake valves are held closed after a combustion event). In these circumstances very different torque profiles will be seen over the course of a working cycle a piston compressed air or exhaust gases may impart more of a "spring" effect. Thus it should be appreciated that the net crankshaft torque witnessed during any particular firing event can be significantly affected by what is happening with the adjacent cylinders. The composite torque can impact the vibration excitation and response characteristics and therefore the slip that might be appropriate at any given time.

In skip fire control, the determination regarding whether or not to fire a particular cylinder is typically made before fuel is injected. Therefore, there is typically a time delay between the firing decision and the realization of any torque impulses associated with that firing decision. That time delay can be advantageously used to both (i) determine the TCC slip value that is desired for that particular firing opportunity; and (b) adjust the TCC line pressure to the level that is appropriate based on the firing decision. In the embodiment illustrated in FIG. 1, firing timing determining unit 94 may be arranged to inform the slip determining unit 97 of the firing commands so that the slip determining unit can track the firing history. If other engines settings such as RPM, MAC, cam phase etc. are used by the slip determining unit, the appropriate information may be provided by the firing fraction determining unit 90, the ECU (not shown) or any other available source.

The described use of the high-bandwidth line pressure modulation facilitates good control of the TCC slip relative to a target TCC slip which mitigates the impacts of firing generated torque pulses on vehicle vibration while providing good fuel economy.

Although regulating slip has been described primarily in the context of regulating the slip of a torque converter clutch, it should be appreciated that similar results can be achieved by any mechanism (clutch or otherwise) that can controllably regulate the slippage of one segment of the drive train to another segment of the drive train. These might include the differential, a dual clutch transmission, a slipping clutch transmission or another drive train component.

Although only a few embodiments have been described in detail, it should be appreciated that the invention may be implemented in many other forms without departing from the spirit or scope of the invention. For example, although TCC slip control has only been described in conjunction with a few particular skip-fire engine controllers, it should be appreciated that the described firing fraction control can be used with a wide variety of different skip-fire controllers and it is not limited to use with the described classes of skip fire controllers and those described in some of the incorporated patents.

Some of the examples in the incorporated patents and patent applications contemplate an optimized skip fire approach in which the fired working chambers are fired under substantially optimal conditions (thermodynamic or otherwise). For example, the mass air charge introduced to the working chambers for each of the cylinder firings may be set at the mass air charge that provides substantially the highest thermodynamic efficiency at the current operating state of the engine (e.g., engine speed, environmental conditions, etc.). The described control approach works very well when used in conjunction with this type of optimized skip fire engine operation. However, that is by no means a requirement. Rather, the described control approach works very well regardless of the conditions that the working chambers are fired under. Furthermore, as suggested above, the conditions in the working chambers may be factors in the determination of the appropriate slip (dampening) at any given time.

In some of the specific examples discussed above, hydraulically actuated clutches were described. Although hydraulic clutch actuation in currently a popular approach, it should be appreciated that the described approach can readily be applied using other clutch actuation technologies including, but not limited to, electromagnetically actuated clutch technologies.

Although modulation of the drive train slip (e.g., torque converter clutch slip) has primarily been described as a function of a skip fire characteristic, and various engine operating characteristics, it should be appreciated that in other embodiments, one or more of a variety of additional factors may also be considered when determining the desired slip. For example, the desired slip may vary as a function of the transmission gear and/or the operational state of the transmission. When a differential has different levels of lockup available, the TCC slip may be varied as a function of the differential lockup state. In still other implementation, the slip may additionally or alternatively be modulated as a function of a measured or estimated vibration (e.g., the longitudinal vibration of the vehicle), estimated or measured acoustics; and/or an estimated or measured road disturbance. When lookup tables are used, any of these factors can be utilized as indices for the look-up tables. Of course, in other embodiments, the appropriate slip can be determined algorithmically or in any other suitable manner. In view of the foregoing, it should be apparent that the present embodiments should be considered illustrative and not restrictive and the invention is not to be limited to the details given herein.

What is claimed is:

1. A method of mitigating power train vibration during skip fire operation of an engine, the method comprising:
    operating an engine in a skip fire operational mode; and
    for each firing opportunity in a sequence of firing opportunities that occur during the skip fire operation of the engine, determining a drive train component slip dynamically on an individual firing opportunity by firing opportunity basis, wherein the slip of the drive train component associated with each firing opportunity is based at least in part upon a skip/fire decision associated with such firing opportunity; and
    modulating the slip of the drive train component in accordance with the determined drive train component slip, whereby in at least some circumstances, the slip of the drive train will be adjusted both up and down for different firing opportunities within a single engine cycle while operating in the skip fire mode.

2. A method as recited in claim 1 wherein the modulated drive train component is a torque converter clutch.

3. A method as recited in claim 1 wherein the modulated drive train component is selected from the group consisting of a differential, a dual clutch transmission and a slipping clutch transmission.

4. A method as recited in claim 1 wherein the drive train component slip is also modulated as a function of at least one engine operational parameter selected from the group consisting of engine speed and an operational engine parameter indicative of the output of fired cylinders.

5. A method as recited in claim 1 wherein relatively higher slip values are used any time a firing is commanded that follows a skip and relatively lower slip values are used any time a skip is commanded.

6. A method as recited in claim 1 wherein the slip of the drive train component associated with each firing opportunity is further based at least in part upon a firing history of a set of preceding firing opportunities.

7. A method as recited in claim 6 wherein the set of preceding firing opportunities includes in the range of 1-7 immediately preceding firing decisions.

8. A method as recited in claim 1 wherein the slip of the drive train component associated with each firing opportunities further varies based on whether an immediately preceding cylinder was fired or not fired.

9. A method as recited in claim 1 wherein the slip of the drive train component based at least in part upon a selected firing decision or a selected set of firing decisions.

10. A method as recited in claim 1 wherein the slip of the drive train component is further based at least in part upon the frequency component of the firing fraction, firing pattern or firing sequence.

11. A method of mitigating vibration during skip fire operation of an engine in a vehicle having a power train that includes a torque converter clutch, the method comprising:
    operating an engine in a skip fire operational mode; and
    modulating slip of a torque converter clutch (TCC) based at least in part upon selected skip/fire decisions associated with particular firing opportunities, wherein relatively higher TCC slip values are used any time a firing is commanded that follows a skip and relatively lower TCC slip values are used any time a skip is commanded.

12. A method as recited in claim 11 wherein the torque converter slip modulation also varies as a function of at least one engine operational parameter selected from or indicative of one selected from the group consisting of engine speed and mass air charge.

13. A method as recited in claim 11 wherein the torque converter slip modulation also varies as a function of at least one of:
    transmission gear;
    an operational state of the transmission;
    a differential lockup state;
    a measured vibration;
    an estimated vibration;
    estimated or measured acoustics; and
    an estimated or measured road disturbance.

14. A method as recited in claim 11 wherein the slip of the torque converter clutch is based at least in part upon a set of skip/fire decisions including the selected skip/fire decision and one or more preceding skip/fire decisions corresponding to a set of firing opportunities immediately preceding the particular firing opportunity.

15. A powertrain controller comprising:
    a firing controller configured to at least sometimes direct an engine to operate in a skip fire operational mode; and
    a power train component controller arranged to control the slip of a power train component based at least in part upon one or more individual skip/fire decisions, wherein during selected skip fire operation, the power train component controller is arranged to determine the slip of the drive train component dynamically on an individual firing opportunity by firing opportunity basis, and to command relatively higher TCC slip values any time a firing is commanded that follows a skip and relatively lower TCC slip values any time a skip is commanded.

16. A powertrain controller as recited in claim 15 wherein the power train component controller is further arranged to command relatively intermediate TCC slip values any time a firing is commanded that follows another firing.

17. A powertrain controller as recited in claim 15 wherein the power train component controller is a torque converter clutch controller.

18. A powertrain controller as recited in claim 15, wherein the firing controller and the power train component controller are embodied as separate discrete devices.

19. A powertrain controller as recited in claim 15 wherein the power train component controller is further arranged to modulate the slip of the power train component as a function of engine speed.

20. A powertrain controller as recited in claim 15 wherein the power train component controller is further arranged to modulate the slip of the power train component as a function of an operational engine parameter representative of the output of each fired cylinder.

21. A powertrain controller as recited in claim 15 wherein the power train component controller is further arranged to vary the slip of the power train component as a function of at least one of:
- transmission gear;
- an operational state of the transmission;
- a differential lockup state;
- a measured or estimated vibration;
- estimated or measured acoustics; and
- an estimated or measured road disturbance.

22. A powertrain controller as recited in claim 15 wherein the slip of the power train component is further based at least in part upon a firing history of a set of immediately preceding firing opportunities.

23. A vehicle powertrain comprising:
- an engine;
- an engine controller arranged to operate the engine in a skip fire operational mode;
- a transmission; and
- a torque converter clutch; and
- a torque converter clutch control block arranged to modulate the slip of the torque converter clutch as a function of a set of skip/fire decisions including the selected skip/fire decision and one or more preceding skip/fire decisions corresponding to a set of firing opportunities immediately preceding the particular firing opportunity.

24. A vehicle powertrain as recited in claim 23 wherein the torque converter control block is configured to command relatively higher slip values any time a firing is commanded that follows a skip and relatively lower slip values any time a skip is commanded.

25. A vehicle powertrain as recited in claim 23 wherein the torque converter clutch control block is further arranged to modulate the slip of the torque converter clutch as a function of engine speed.

26. A vehicle powertrain as recited in claim 23 wherein the torque converter clutch control block is further arranged to modulate the slip of the torque converter clutch as a function of at least one operational engine parameter representative of the output of each fired cylinder.

27. A vehicle powertrain as recited in claim 26 wherein the at least one operational engine parameter is selected from the group consisting of:
- mass air charge;
- manifold pressure;
- cylinder charge;
- ignition timing;
- fuel injection timing;
- cam phase;
- intake valve opening and closing timing; and
- exhaust valve opening and closing timing.

* * * * *